(12) United States Patent
Wilkinson et al.

(10) Patent No.: US 10,423,921 B2
(45) Date of Patent: Sep. 24, 2019

(54) DELIVERY RESERVATION APPARATUS AND METHOD

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/861,094

(22) Filed: Jan. 3, 2018

(65) Prior Publication Data

US 2018/0189730 A1 Jul. 5, 2018

Related U.S. Application Data

(60) Provisional application No. 62/441,705, filed on Jan. 3, 2017.

(51) Int. Cl.
*G06Q 10/08* (2012.01)
*G06Q 20/38* (2012.01)
(Continued)

(52) U.S. Cl.
CPC ......... *G06Q 10/0836* (2013.01); *G06Q 10/02* (2013.01); *G06Q 50/28* (2013.01); *G07C 9/00896* (2013.01); *G07F 17/12* (2013.01); *G06Q 20/0655* (2013.01); *G06Q 20/223* (2013.01); *G06Q 20/3827* (2013.01); *G06Q 20/3829* (2013.01); *G06Q 20/4014* (2013.01);
(Continued)

(58) Field of Classification Search
CPC ............ G06Q 10/0836; G06Q 10/02

USPC ............................................ 705/5
See application file for complete search history.

(56) References Cited

U.S. PATENT DOCUMENTS 6,195,005 B1  2/2001  Maloney
7,339,469 B2  3/2008  Braun
(Continued)

FOREIGN PATENT DOCUMENTS

DE      10331356      2/2005

OTHER PUBLICATIONS

Bike sharing systems:parking reservation policies and maintenance operations by Mor Karspi (Year: 2015).*
(Continued)

*Primary Examiner* — Shannon S Campbell
*Assistant Examiner* — Zeina Elchanti
(74) *Attorney, Agent, or Firm* — Fitch, Even, Tabin & Flannery LLP

(57) ABSTRACT

In some embodiments, apparatuses and methods are provided herein useful to manage reservations and deliveries for a docking station. More specifically, the various embodiments described herein track spaces on a docking station to determine whether one or more spaces are available when requested by a delivery device. Each space on the docking station has a corresponding capacity unit for each location on the docking station. The transactions for the capacity units are tracked in a ledger, with available capacity units indicating an open location on the docking station or contracted out capacity units indicating that either the location has a locker secured thereto or that the location is reserved for a future delivery.

18 Claims, 9 Drawing Sheets

(51) Int. Cl.
*G06Q 50/28* (2012.01)
*G07F 17/12* (2006.01)
*G06Q 10/02* (2012.01)
*G07C 9/00* (2006.01)
*G06Q 20/22* (2012.01)
*G06Q 20/06* (2012.01)
*G06Q 20/40* (2012.01)

(52) U.S. Cl.
CPC . *G06Q 2220/00* (2013.01); *G07C 2009/0092* (2013.01)

(56) References Cited

U.S. PATENT DOCUMENTS

| | | | |
|---|---|---|---|
| 7,482,928 B2 | 1/2009 | Brackmann | |
| 2002/0177922 A1* | 11/2002 | Bloom | G06Q 20/00 700/213 |
| 2004/0015393 A1 | 1/2004 | Fong | |
| 2004/0075557 A1 | 4/2004 | Selwyn | |
| 2005/0083176 A1* | 4/2005 | Yamada | G01C 21/26 340/5.73 |
| 2006/0229895 A1* | 10/2006 | Kodger, Jr. | G06Q 10/025 705/333 |
| 2006/0232412 A1 | 10/2006 | Tabacman | |
| 2013/0144428 A1* | 6/2013 | Irwin | B65G 1/0485 700/218 |
| 2014/0330428 A1 | 11/2014 | Wolfe | |
| 2015/0106292 A1* | 4/2015 | Robinson | G06F 21/62 705/339 |
| 2015/0186840 A1* | 7/2015 | Torres | A47B 81/00 705/339 |
| 2015/0302400 A1 | 10/2015 | Metral | |
| 2016/0133074 A1* | 5/2016 | Amdahl | G07C 9/00571 340/5.54 |
| 2016/0216106 A1* | 7/2016 | Motoyama | G01B 11/28 |
| 2017/0193619 A1* | 7/2017 | Rollins | G06Q 50/184 |

OTHER PUBLICATIONS

PCT; App. No. PCT/US18/12186; International Search Report and Written Opinion dated Mar. 16, 2018.

* cited by examiner

DELIVERY RESERVATION APPARATUS AND METHOD

CROSS-REFERENCE TO RELATED APPLICATION

This application claims the benefit of U.S. Provisional Application No. 62/441,705 filed Jan. 3, 2017, which is incorporated herein by reference in its entirety.

TECHNICAL FIELD

This invention relates generally to delivery of products and, more particularly, to scheduling delivery of products.

BACKGROUND

While delivery provides the convenience of avoiding having to travel to a brick-and-mortar store or transport objects, scheduling the delivery can present difficulties, especially where the delivery requires a signature. In such a case, the recipient may be required to be present at the delivery location or could leave a signed authorization for the delivery person to leave the item. In the first instance, it may be difficult to schedule a time when both the delivery company and the recipient are available at the same time. In the second instance, the item may be left in an unsecured area for extended periods.

BRIEF DESCRIPTION OF THE DRAWINGS

Disclosed herein are embodiments of systems, apparatuses and methods pertaining to the scheduling and delivery of products. This description includes drawings, wherein.

Figure 1:
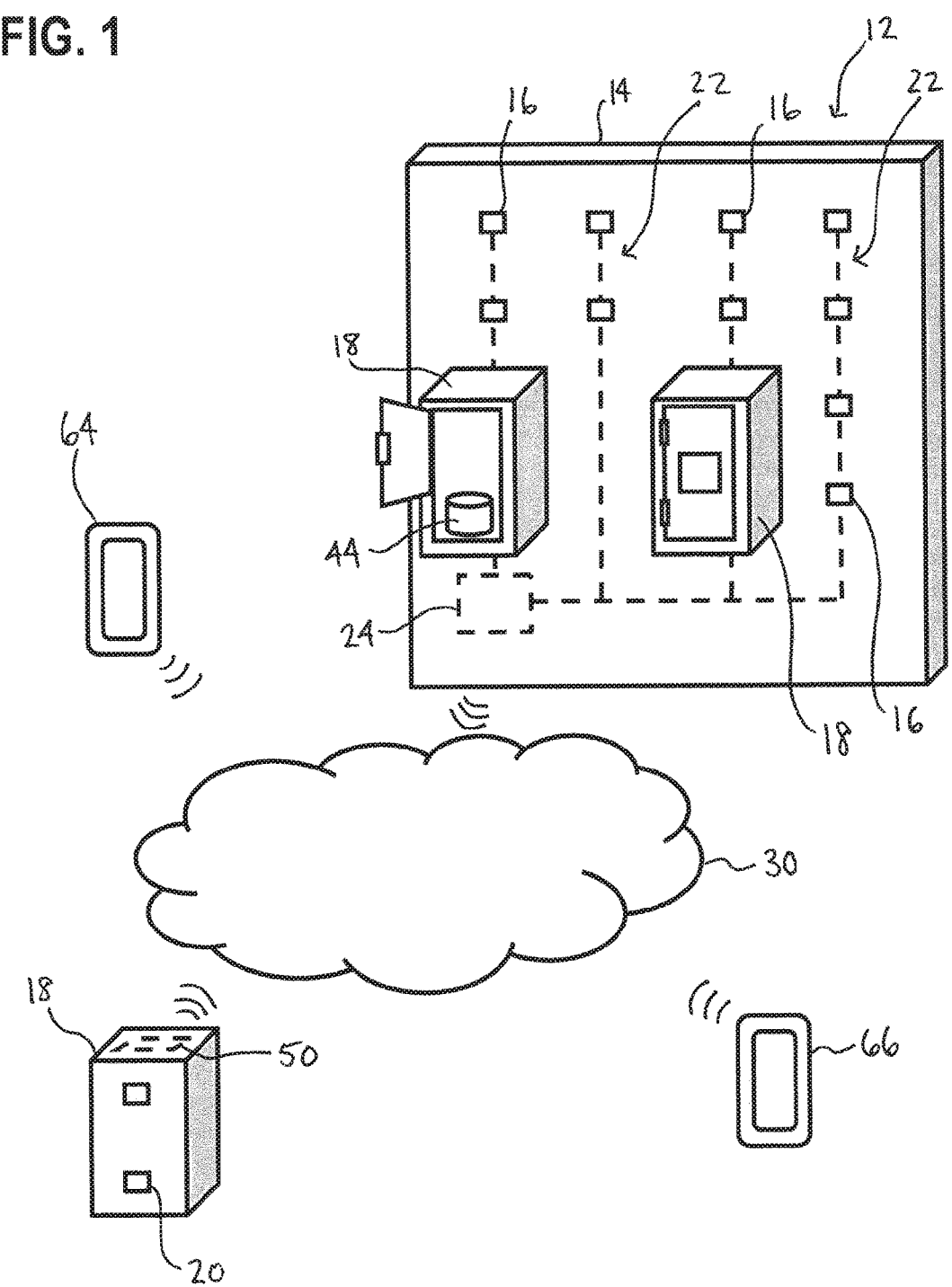
FIG. 1 is a perspective view of a docking station for lockers in accordance with some embodiments.
Figures 2, 3:
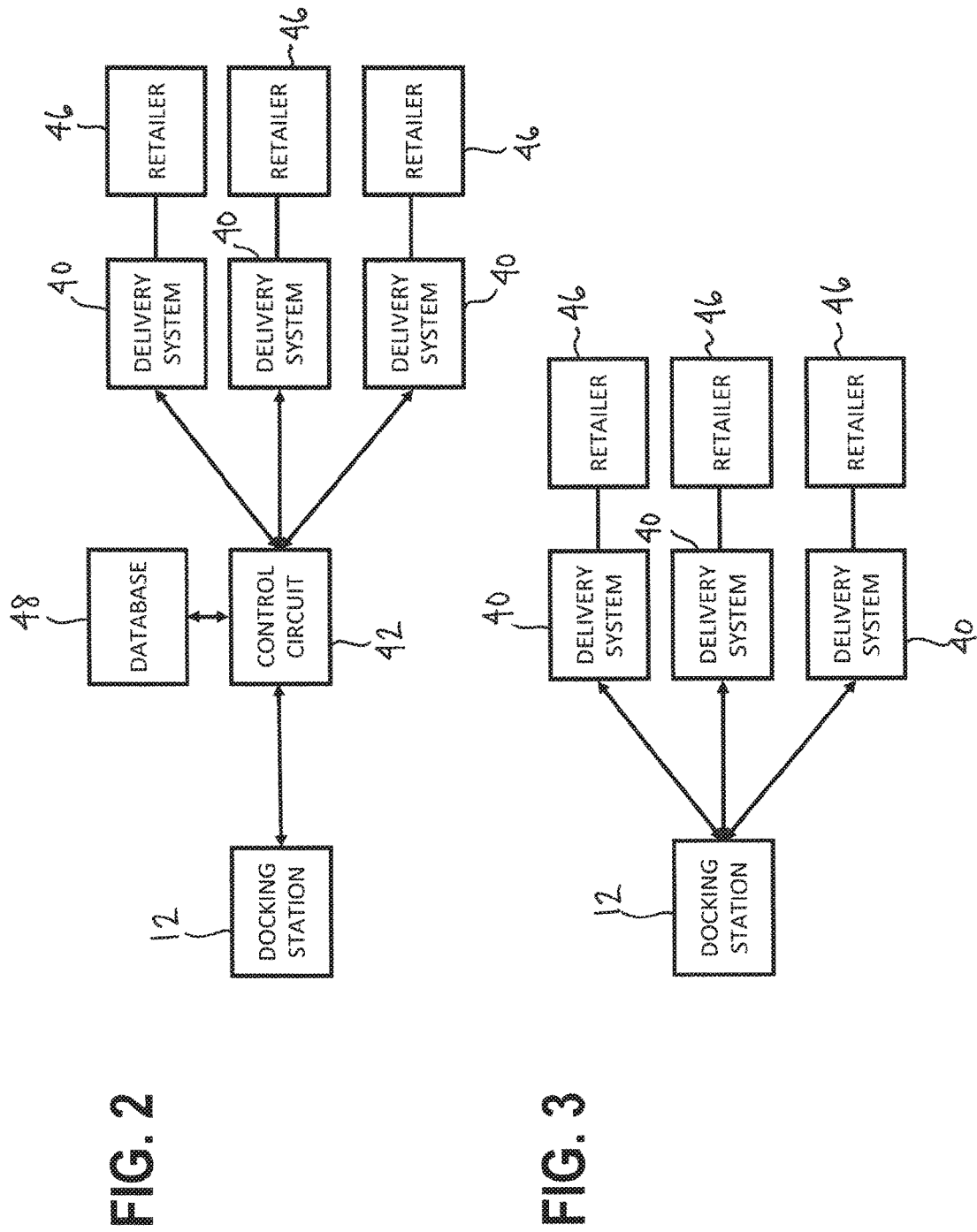
FIG. 2 is a system diagram for scheduling deliveries in accordance with several embodiments.
FIG. 3 is a system diagram for scheduling deliveries in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to manage reservations and deliveries for a docking station. More specifically, the various embodiments described herein track spaces on a docking station to determine whether one or more spaces are available when requested by a delivery device. Each space on the docking station has a corresponding capacity unit for each location on the docking station. The transactions for the capacity units are tracked in a ledger, with available capacity units indicating an open location on the docking station or contracted out capacity units indicating that either the location has a locker secured thereto or that the location is reserved for a future delivery.

So configured, multiple entities can deliver to a single docking station by reserving needed space beforehand. The various embodiments, systems, apparatuses, and methods described herein can coordinate with the multiple entities to determine if a docking station has sufficient space for a particular delivery, reserve one or more locations for future delivery, and maintain a ledger tracking the availability of the locations. The ledger is public and contains a record of available and reserved capacity units for the particular docking station.

In one illustrative approach, a control circuit associated with a locker docking station manages the public ledger. In another approach, one or more control circuits (some or all of which may be remote from the locker docking station) manage the public ledger. In yet another approach, a central server is configured to audit the public ledger (which may be maintained by multiple control circuits) to inspect the ledger to ensure accuracy, security, and proper operation thereof. Similarly, the control circuit(s) that manage the public ledger may be disposed at a central server, in another configuration.

Pursuant to this, a reservation management system 10 as described herein is shown in FIGS. 1-4. The management system 10 can include one or more docking stations 12 which can be distributed and remote from one another at desired locations. For example, the docking stations 12 can be located at a user's home, at public locations such as transportation hubs, public venues, or the like, or other desired locations. Each docking station 12 includes a support structure 14, such as an upstanding wall as shown, with one or more securing mechanisms 16 mounted thereto. The securing mechanisms 16 are configured to releasably secure a locker 18 to the docking station 12 and can take any desired form, including interlocking mechanical components, magnetic coupling components, and so forth. By one approach, the lockers 18 are universal lockers with standardized coupling components 20, such that the lockers 18 can be utilized by multiple parties to secure to any desired docking station 12. Each securing mechanism 16 corresponds to one available location or space 22 on the docking station 12.

Figure 4:
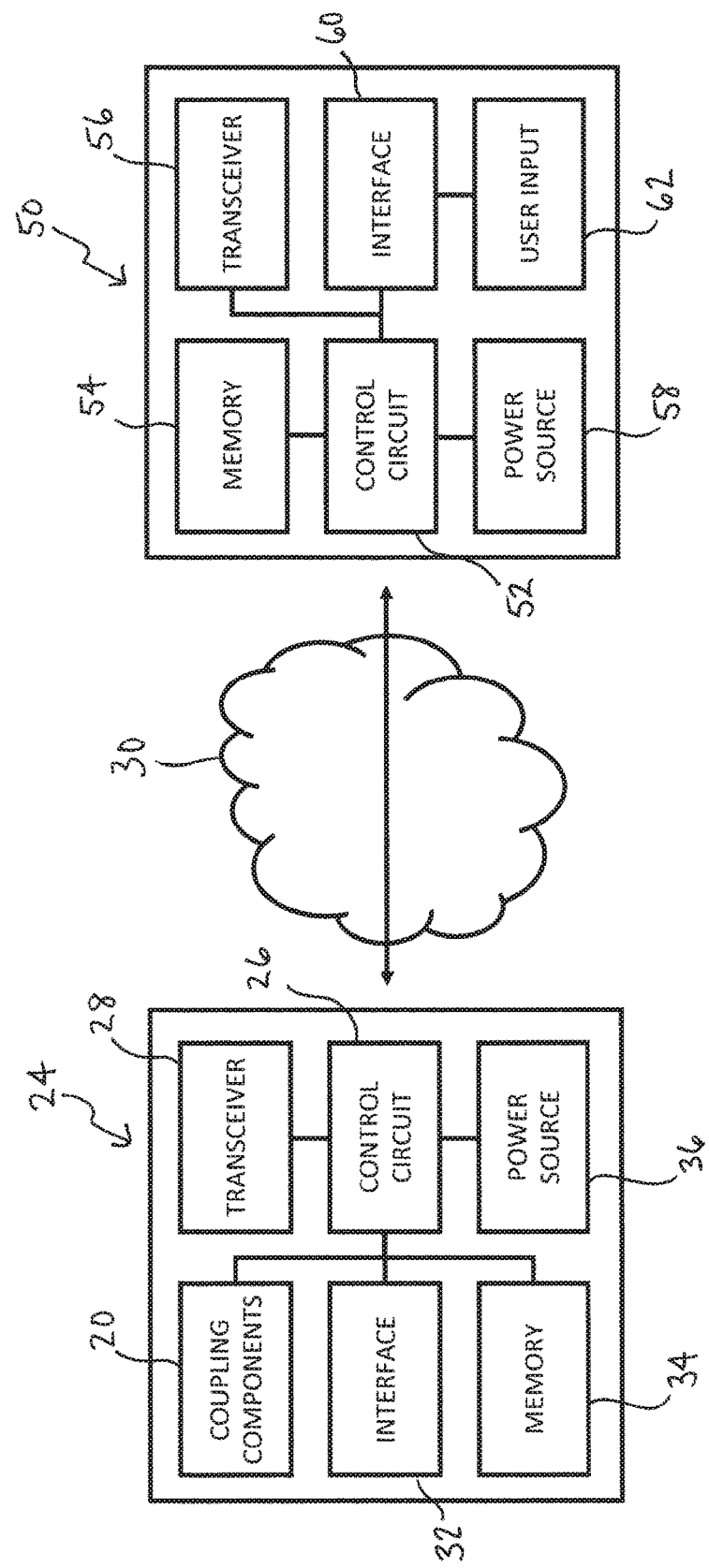
FIG. 4 is a system diagram of docking station and locker electronic assemblies in accordance with several embodiments.
Figure 5:
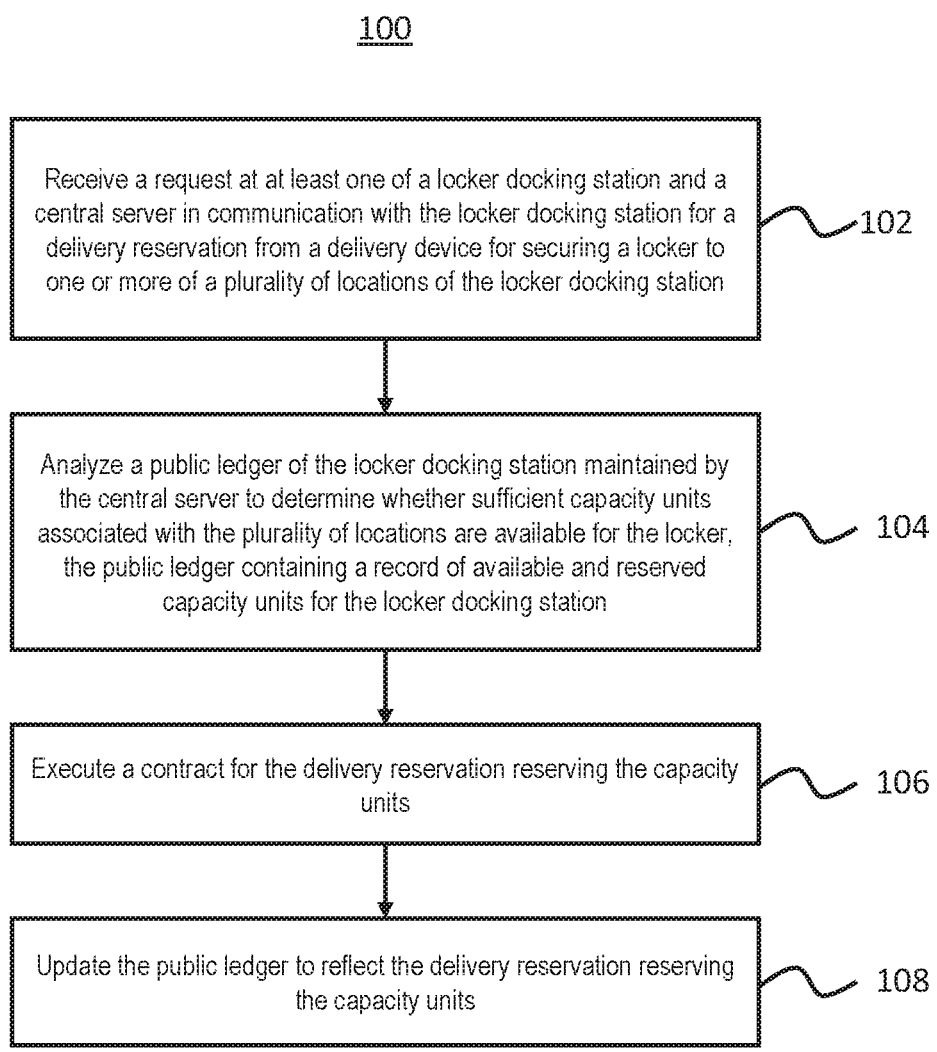
FIG. 5 is a flowchart in accordance with some embodiments.

As shown in FIGS. 1 and 4, the docking station 12 includes an electronic assembly 24 with a control circuit 26 controlling operation thereof. The electronic assembly 24 can further include the securing mechanisms 16, a transceiver 28 configured to communicate over one or more communication networks 30, such as radio, internet, Bluetooth, near field communication, and so forth, an interface 32, a memory 34, and a power source 36, which can be wired or portable as desired.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit may be configured (for example, by using corresponding programming stored in a memory as will be well understood by those skilled in the art) to carry out one or more of the steps, actions, and/or functions described herein.

In some embodiments, the docking stations 12 utilize a blockchain reservation system. As such, each docking station 12 can be a node within a blockchain network. Pursuant to this, after the docking stations 12 are installed at desired locations and commissioned, each docking station 12 is sent or assigned capacity units for each of the storage locations 22 thereof. In a preferred form, each docking station 12 is sent a blockchain with the maximum number of capacity units for the particular docking station 12. Thereafter, the capacity units of each docking station 12 are represented in a ledger that tracks the availability of each storage location 22. More specifically, the ledger contains a record of available and reserved capacity units for the docking station 12.

By a first approach, the docking station 12 coordinates directly with one or more delivery systems 40 to schedule delivery of lockers 18 to be secured to the docking station 12. In this case, the docking station 12 maintains its own ledger. By a second approach, a central control circuit 42 coordinates with the delivery systems 40 and maintains the ledgers 38 for each of the docking stations 12 of the network.

Although the system described herein is suitable for any delivery situation, a purchase order delivery will be described in more detail. More specifically, a customer orders one or more products 44 from a retailer or manufacturer 46 and requests delivery. The purchase can be in-store, online, over the phone, or the like. The retailer or manufacturer 46 can utilize an internal delivery system 40 or a third party delivery service 40 to coordinate and handle delivery of the products 44 to the customer. The delivery system 40 then determines the number and/or size of lockers 18 needed to store the ordered products 44.

To contact the docking station 12, the delivery system 40 can be sent identification information for the docking station 12 associated with the customer or can be configured to search for the docking station 12 based on customer identification information provided in the order. Thereafter the delivery system 40 connects to the desired docking station 12 through any desired communication network 30 to set up a delivery transaction. The delivery system 40 provides a public key to the docking station and requests the number of capacity units needed to secure the lockers 18 thereto. The delivery system 40 can request a delivery time range or the docking station 12 can assign a time range for delivery, as desired. The docking station 12 authenticates the public key and creates a blockchain contract to reserve and use the requested capacity units. The docking station 12 then compares the blockchain contract with the ledger. If the ledger indicates that the capacity units are available for the requested time, the blockchain contract is validated. Thereafter, the ledger is updated to reflect the capacity units reserved by the contract. In the embodiments having a central control circuit 42, the updated ledger can be sent thereto to be stored on a database 48 or the like. Alternatively, the central control circuit 42 can maintain and update the ledger. Accordingly, when a subsequent delivery system 40 contacts the docking station 12, the capacity units will not be available for the time reserved. Further, if the docking station 12 does not have sufficient capacity units for a particular delivery, then the contract and the proposed delivery will be denied for the requested time.

As such, the delivery system 40 is ensured a delivery location 22 at the reserved time. The delivery system 40 then coordinates shipping the products 44, packing the products 44 in the locker(s) 18, and shipping the lockers 18 to the docking station 12 at the reserved time.

When a delivery person arrives at the location of the docking station 12, as shown in FIG. 4, the locker 18 communicates with the docking station 12 over any suitable communication network 30 to validate the transaction. In some embodiments, as shown in FIG. 4, the locker 18 includes an electronic assembly 50 having a control circuit 52, a memory 54, a transceiver 56, a power source 58, an interface 60 with a user input 62, such as a touch screen, keypad, or the like, and the coupling components 20, if electrically operated. By one approach, the delivery person could actuate the user input 62 to initiate the communication with the docking station 12. By another approach, either the locker 18 or the docking station 12 can be configured to periodically or continuously output a signal that, in response to be received by the other, initiates the communication.

In some embodiments, the locker 18 sends an actual count of the capacity units required for the locker(s) 18 to couple to the docking station 12. The locker 18 also sends the reservation contract to the docking station 12. If desired, the locker 18 can send a hash of the reservation contract to the docking station or other suitable code, the hash or code allowing the locker 18 to authenticate itself with the docking station 12. If the docking station determines that the actual count is less than the reserved capacity units, the docking station 12, or central control circuit 42, can update the ledger to reflect the additional, released capacity units.

The docking station 12 then confirms the contract and sends a confirmation signal to the locker 18 and/or a smart device 64 of the delivery person to provide notification of the confirmation. As described herein, smart device, refers to any smart communication device, such as a phone, tablet, laptop, or other computing device. Thereafter, the control circuit 26 operates the securing mechanisms 16 for the locations 22 corresponding to the contract capacity units so that the locker 18 can be coupled thereto. If applicable, the locker control circuit 52 can operate the coupling components 20 thereof to secure the locker 18 to the docking station 12. On the other hand, by some approaches, if the locker 18 cannot authenticate itself to confirm that capacity units are reserved for the locker 18, the docking station 12 will not operate to secure the locker 18 thereto.

After the locker 18 is secured to the docking station 12, the docking station 12, the locker 18, and/or the delivery person smart device 64 sends a delivery notification message to a customer device 66 to inform the customer that the product 44 has been delivered to the docking station 12. Thereafter, the user can open the locker 18 using any suitable method, such as by entering a passcode or biometric information using the interface 32, sending access rights data, such as a passcode or the like, to the control circuit 26 with the customer device 66, using a key, and so forth.

When the customer retrieves the products 44 from the locker 18, the locker 18 and/or docking station 12 can send a notification message to the delivery system 40 to notify the delivery service of the completed delivery and the availability of the locker 18 for pick-up. Further, by some approaches, the contract includes a pick-up time or deadline by which the locker 18 should be decoupled from the docking station 12 so that docking station 12 can accurately and reliably form contracts with the delivery systems 40. When the locker 18 is decoupled from the docking station 12, the docking station 12 can update the ledger to reflect the additional available capacity units. The locker 18 can be decoupled from the docking station 12 at the behest of an entry at the user input 62, a signal from the delivery smart device 64, according to a timer, or the like.

If the locker 18 is still secured to the docking station 12 past the deadline, the docking station 12 and/or locker 18 can be configured to send a past-due notification signal or message to the delivery system 40. If necessary, by one approach, the docking station 12 can operate the coupling components 20 to decouple the locker 18 from the docking station 12 whether a delivery person is there to collect the locker 18 or not. By another approach, the docking station 12 and/or the central control circuit 42 can revise delivery times so that delivered lockers 18 are ensured sufficient capacity units and send messages to the delivery systems 40 to provide notification of the revision.

By some approaches, the docking station 12 can be associated with a single customer or customer group. By other approaches, the docking station 12 can be associated with a plurality of customers. As such, individual ones of the locations 22 on the docking stations can be owned by or associated with one of the customers. For example, the docking station 12 may be located adjacent to a condominium or apartment building, or the like, and each owner/tenant can have one or more locations 22 on the docking station 12 to receive deliveries. Accordingly, in this form, the delivery system 40 requests capacity units for the locations 22 owned by or associated with the customer that placed the order for the products 44. Further, the docking station 12 can restrict coupling to lockers 18 at locations 22 not associated with or owned by the customer on delivery. Alternatively, each customer may have a certain number of capacity units without specific associated locations 22 on the docking station 12.

So configured, the docking station 12 and, if desired, the central control circuit 42, is configured to coordinate with multiple delivery systems and schedule secure delivery of products to a customer.

By further approaches, a delivery person can attempt to deliver locker 18 without a prior contract for reserving capacity units. In such a case, the locker 18 and/or delivery device 64 communicates with the docking station 12 to determine whether capacity units are available for an immediate delivery. The docking station 12 checks the ledger to determine whether the requested capacity units are available and, if so, prepares a blockchain delivery contract and performs on the fly authentication of the locker 18. If there are not sufficient capacity units available, due to lockers 18 secured to the docking station 12 or scheduled for delivery, the delivery is denied.

Descriptions of some embodiments of blockchain technology are provided with reference to FIG. 6-11 herein. In some embodiments of the invention described above, blockchain technology may be utilized to record delivery records and transactions. One or more of the docking stations 12 as described herein may comprise a node in a distributed blockchain system storing a copy of the blockchain record. Updates to the blockchain may comprise transfer of capacity units into and out of the public ledger and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (http://bitcoin.org/bitcoin.pdf), the entirety of which is incorporated herein by reference.

Figure 6:
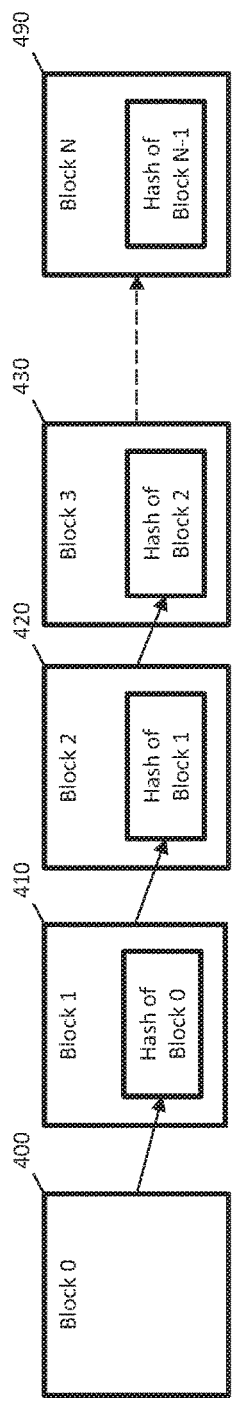
FIG. 6 is an illustration of blocks as configured in accordance with several embodiments.

Now referring to FIG. 6, an illustration of a blockchain according to some embodiments is shown. In some embodiments, a blockchain comprises a hash chain or a hash tree in which each block added in the chain contains a hash of the previous block. In FIG. 6, block 0 400 represents a genesis block of the chain. Block 1 410 contains a hash of block 0 400, block 2 420 contains a hash of block 1 410, block 3 430 contains a hash of block 2 420, and so forth. Continuing down the chain, block N contains a hash of block N−1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners" are nodes that compete to provide proof-of-work to form a new block, and the first successful miner of a new block earns Bitcoin currency in return.

Figure 7:
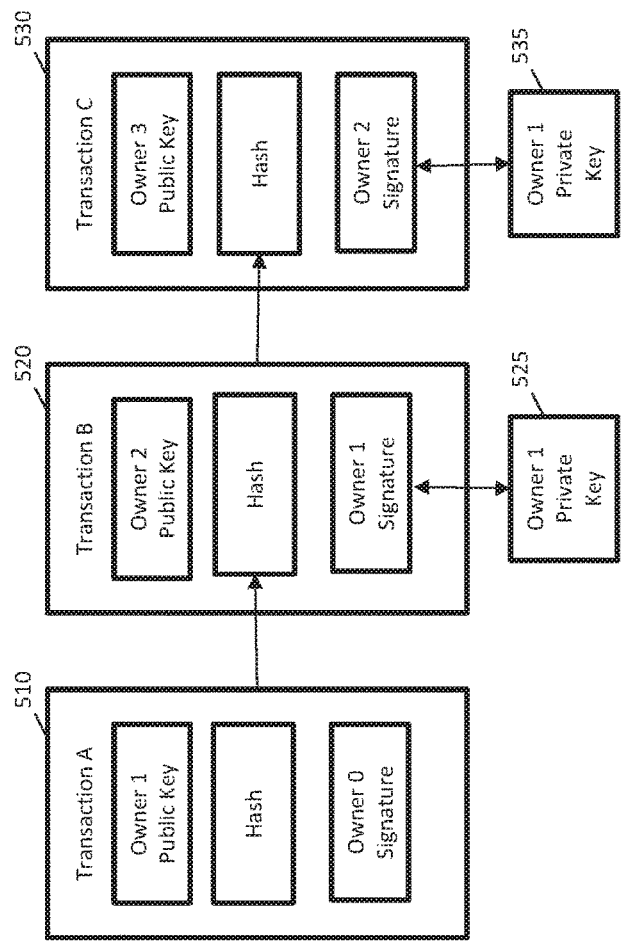
FIG. 7 is an illustration of transactions configured in accordance with some embodiments.

Now referring to FIG. 7, an illustration of blockchain based transactions according to some embodiments is shown. In some embodiments, the blockchain illustrated in FIG. 7 comprises a hash chain protected by private/public key encryption. Transaction A 510 represents a transaction recorded in a block of a blockchain showing that owner 1 (recipient) obtained an asset from owner 0 (sender). Transaction A 510 contains owner's 1 public key and owner 0's signature for the transaction and a hash of a previous block. When owner 1 transfers the asset to owner 2, a block containing transaction B 520 is formed. The record of transaction B 520 comprises the public key of owner 2 (recipient), a hash of the previous block, and owner 1's signature for the transaction that is signed with the owner 1's private key 525 and verified using owner 1's public key in transaction A 510. When owner 2 transfers the asset to owner 3, a block containing transaction C 530 is formed. The record of transaction C 530 comprises the public key of owner 3 (recipient), a hash of the previous block, and owner 2's signature for the transaction that is signed by owner 2's private key 535 and verified using owner 2's public key from transaction B 220. In some embodiments, when each transaction record is created, the system may check previous transaction records and the current owner's private and public key signature to determine whether the transaction is valid. In some embodiments, transactions are to be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 7 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 8:
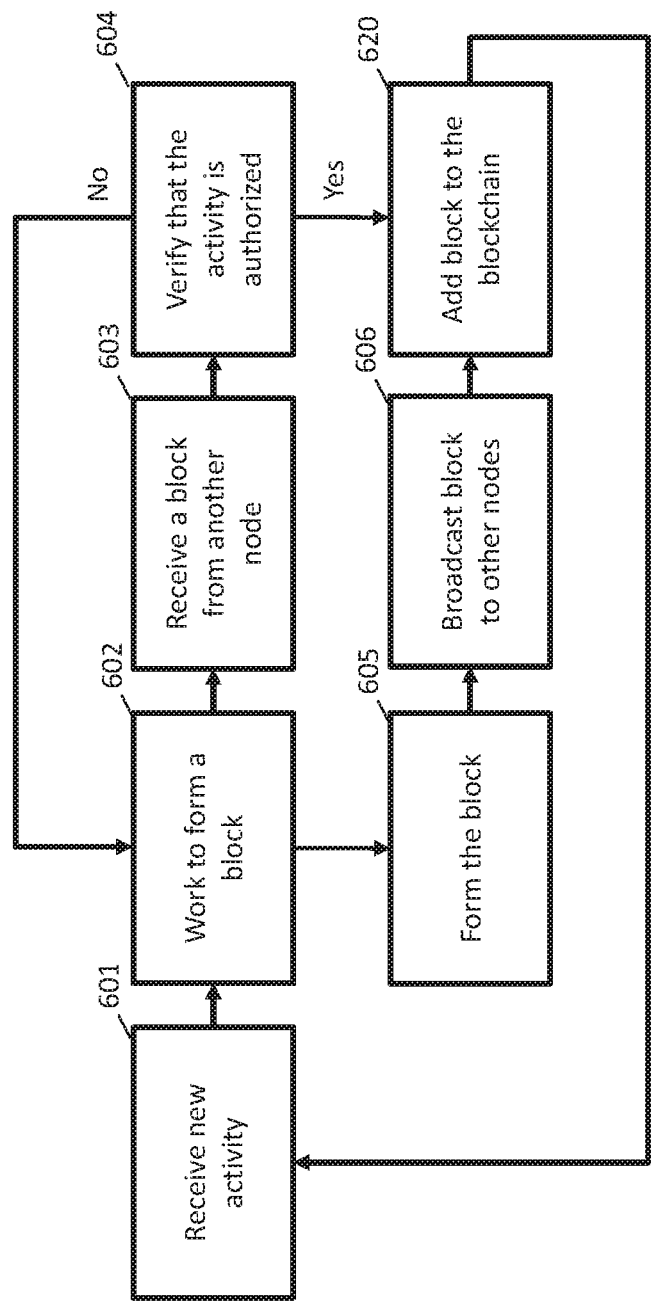
FIG. 8 is a flow diagram in accordance with several embodiments.

Now referring to FIG. 8, a flow diagram according to some embodiments is shown. In some embodiments, the steps shown in FIG. 8 may be performed by a processor-based device, such as a computer system, a server, a distributed server, a timestamp server, a blockchain node, and the like. In some embodiments, the steps in FIG. 8 may be performed by one or more of the nodes in a system using blockchain for record keeping.

In step 601, a node receives a new activity. The new activity may comprise an update to the record being kept in the form of a blockchain. In some embodiments, for blockchain supported digital or physical asset record keeping, the new activity may comprise an asset transaction. In some embodiments, the new activity may be broadcasted to a plurality of nodes on the network prior to step 601. In step 602, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for forming a nonce in order to form a block. In some embodiments, the node may be configured to verify that the activity is authorized prior to working to form the block. In some embodiments, whether the activity is authorized may be determined based on records in the earlier blocks of the blockchain itself.

After step 602, if the node successfully forms a block in step 605 prior to receiving a block from another node, the node broadcasts the block to other nodes over the network in step 606. In some embodiments, in a system with incentive features, the first node to form a block may be permitted to add incentive payment to itself in the newly formed block. In step 620, the node then adds the block to its copy of the blockchain. In the event that the node receives a block formed by another node in step 603 prior to being able to form the block, the node works to verify that the activity recorded in the received block is authorized in step 604. In some embodiments, the node may further check the new block against system consensus rules for blocks and activities to verify whether the block is properly formed. If the new block is not authorized, the node may reject the block update and return to step 602 to continue to work to form the block. If the new block is verified by the node, the node may express its approval by adding the received block to its copy of the blockchain in step 620. After a block is added, the node then returns to step 601 to form the next block using the newly extended blockchain for the hash in the new block.

In some embodiments, in the event one or more blocks having the same block number is received after step 620, the node may verify the later arriving blocks and temporarily store these blocks if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 601.

Figure 9:
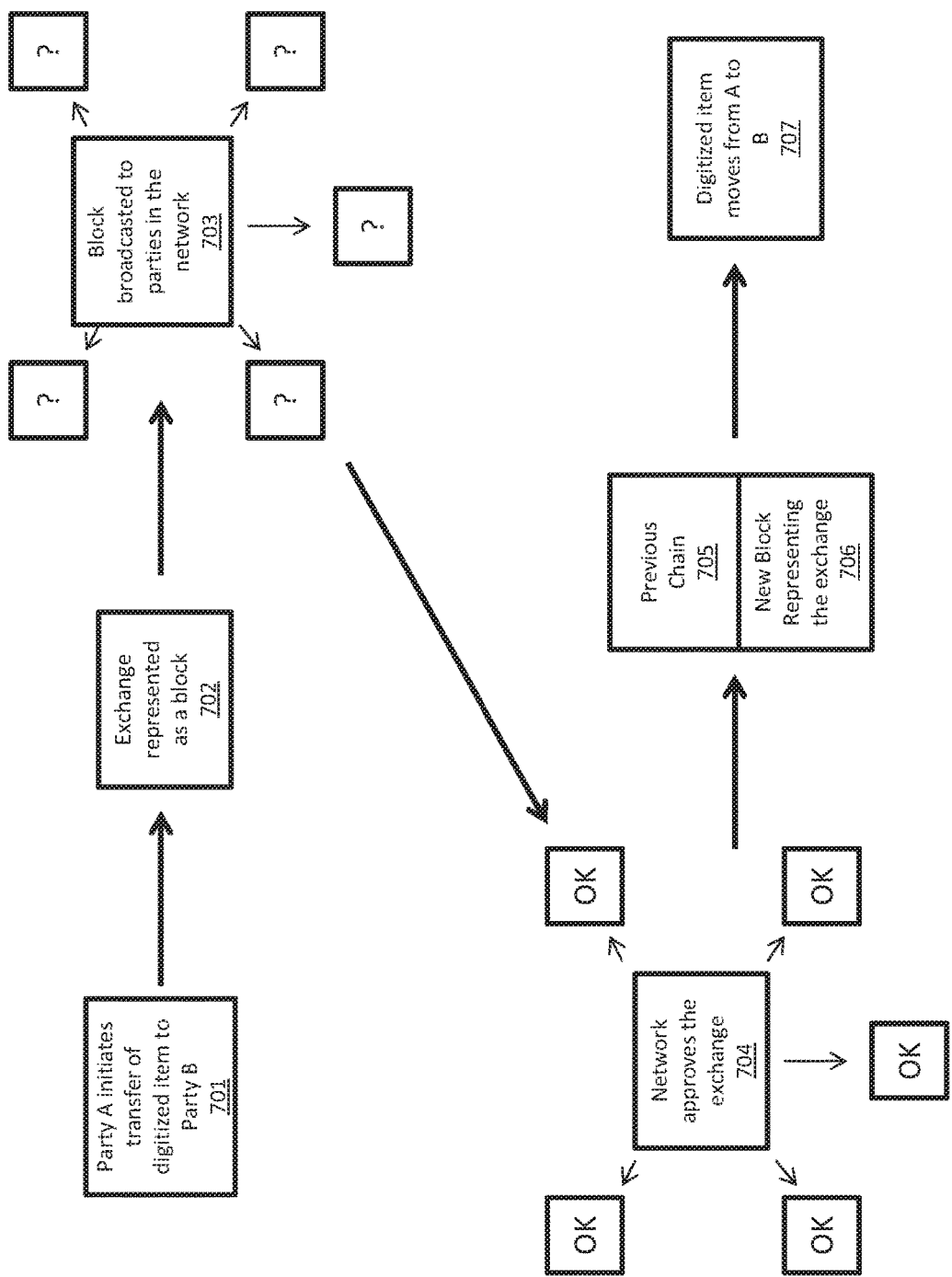
FIG. 9 is a process diagram as configured in accordance with some embodiments.

Now referring to FIG. 9, a process diagram of a blockchain update according to some implementations in shown. In step 701, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 702, the exchange initiated in step 701 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide proof-of-work to form the block may earn a Bitcoin. In some embodiments, a block may comprise one or more transactions between different parties that are broadcasted to the nodes. In step 703, the block is broadcasted to parties in the network. In step 704, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the asset he/she seeks to transfer). In some embodiments, a block may be approved with consensus of the nodes in the network. After a block is approved, the new block 706 representing the exchange is added to the existing chain 705 comprising blocks that chronologically precede the new block 706. The new block 706 may contain the transaction(s) and a hash of one or more blocks in the existing chain 705. In some embodiments, each node may then update their copy of the blockchain with the new block and continue to work on extending the chain with additional transactions. In step 707, when the chain is updated with the new block, the digitized item is moved from party A to party B.

Figure 10:
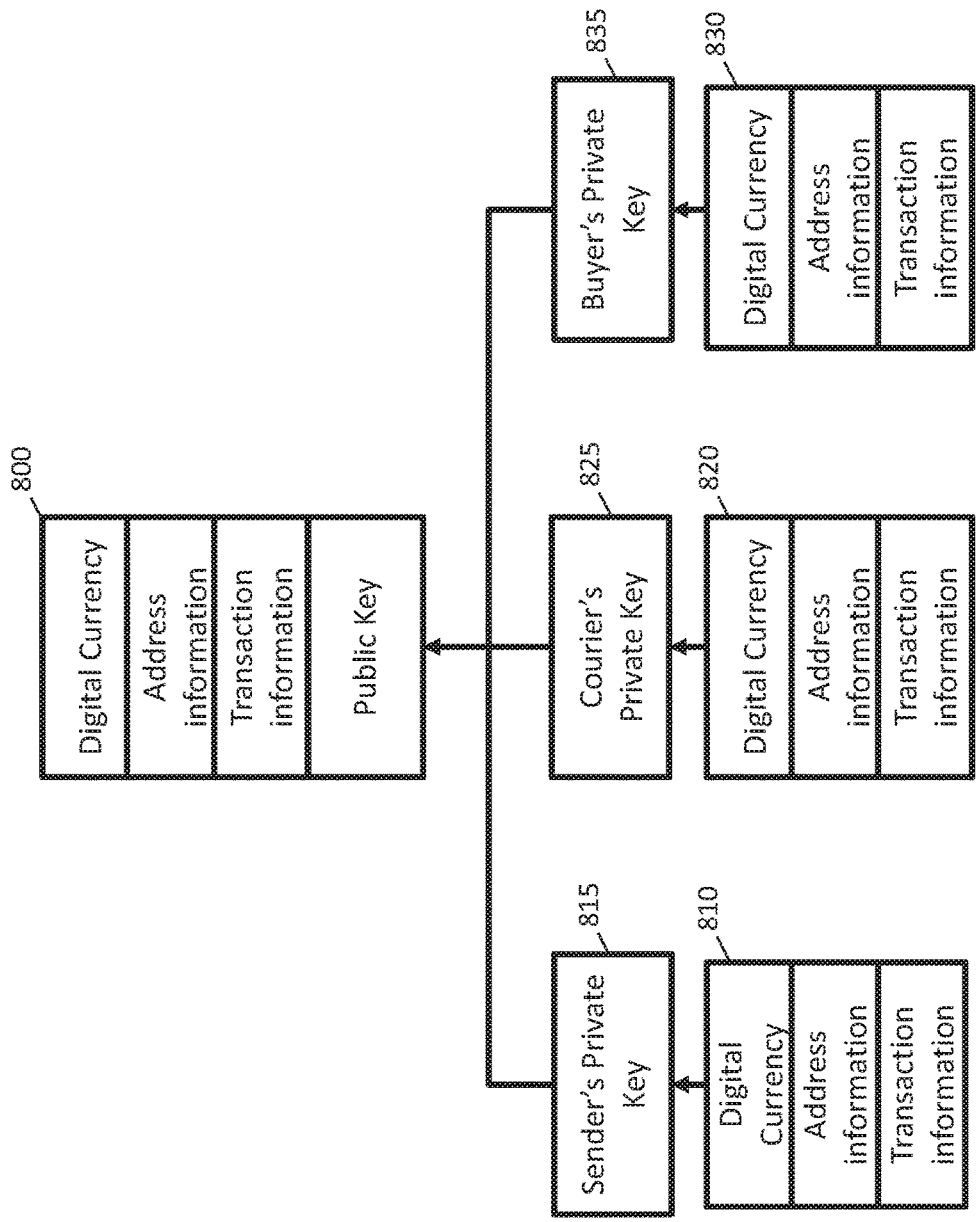
FIG. 10 is an illustration of a delivery record configured in accordance with several embodiments.

Now referring to FIG. 10, a diagram of a blockchain according to some embodiments in shown. FIG. 10 comprises an example of an implementation of a blockchain system for delivery service record keeping. The delivery record 800 comprises digital currency information, address information, transaction information, and a public key associated with one or more of a sender, a courier, and a buyer. In some embodiments, nodes associated the sender, the courier, and the buyer may each store a copy of the delivery record 810, 820, and 830 respectively. In some embodiments, the delivery record 800 comprises a public key that allows the sender, the courier, and/or the buyer to view and/or update the delivery record 800 using their private keys 815, 825, and the 835 respectively. For example, when a package is transferred from a sender to the courier, the sender may use the sender's private key 815 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 825 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 10, the delivery record may be updated by one or more of the sender, courier, and the buyer to form a record of the transaction without a trusted third party while preventing unauthorized modifications to the record. In some embodiments, the blockchain based transactions may further function to include transfers of digital currency with the completion of the transfer of physical asset. With the distributed database and peer-to-peer verification of a blockchain system, the sender, the courier, and the buyer can each have confidence in the authenticity and accuracy of the delivery record stored in the form of a blockchain.

Figure 11:
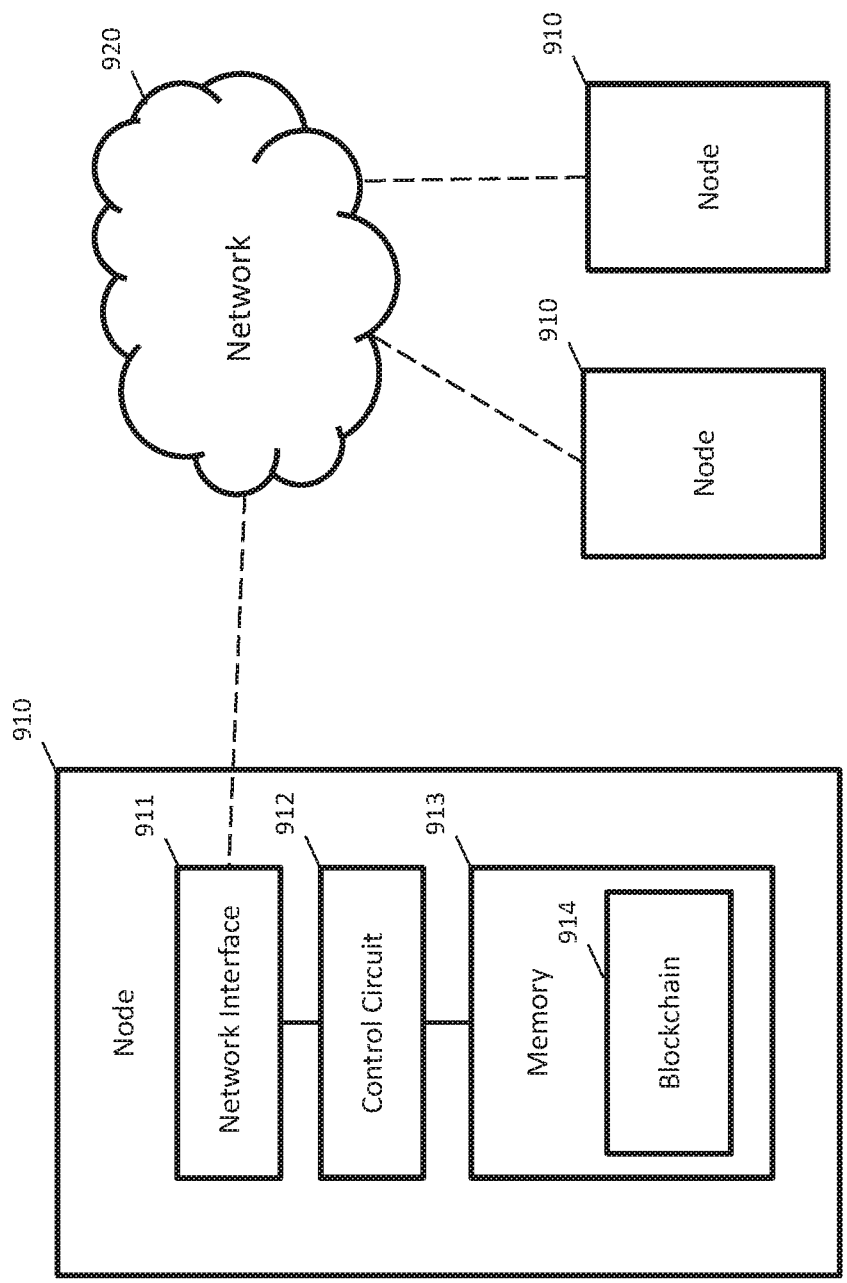
FIG. 11 is a system diagram configured in accordance with some embodiments.

Now referring to FIG. 11, a system according to some embodiments is shown. A distributed blockchain system comprises a plurality of nodes 910 communicating over a network 920. In some embodiments, the nodes 910 may be comprise a distributed blockchain server and/or a distributed timestamp server. In some embodiments, one or more nodes 910 may comprise or be similar to a "miner" device on the Bitcoin network. Each node 910 in the system comprises a network interface 911, a control circuit 912, and a memory 913.

The control circuit 912 may comprise a processor, a microprocessor, and the like and may be configured to execute computer readable instructions stored on a computer readable storage memory 913. The computer readable storage memory may comprise volatile and/or non-volatile memory and have stored upon it a set of computer readable instructions which, when executed by the control circuit 912, causes the node 910 update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 8-9 herein.

The network interface 911 may comprise one or more network devices configured to allow the control circuit to receive and transmit information via the network 920. In some embodiments, the network interface 911 may comprise one or more of a network adapter, a modem, a router, a data port, a transceiver, and the like. The network 920 may comprise a communication network configured to allow one or more nodes 910 to exchange data. In some embodiments, the network 920 may comprise one or more of the Internet, a local area network, a private network, a virtual private network, a home network, a wired network, a wireless network, and the like. As suggested above, in some embodiments, the system does not include a central server and/or a trusted third party system. Each node in the system may enter and leave the network at any time.

With the system and processes shown herein, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may be used to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one of more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain based system allows content use, content exchange, and the use of content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that uses one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

In some embodiments, a reservation system for locations on a locker docking station is described herein that includes: a locker docking station having a plurality of locations thereon configured to have a locker secured thereto; and one or more control circuits in communication with a plurality of locker docking stations including the locker docking station. The plurality of locations of the locker docking station have associated capacity units and at least one of the one or more control circuits is configured to maintain a public ledger of the capacity units for the plurality of locker docking stations. The public ledger contains a record of available and reserved capacity units for the plurality of locker docking stations. At least one of the control circuits is configured to: receive a request for a delivery reservation from a delivery device for delivery of a locker to one or more of the plurality of locations of the locker docking station; analyze the public ledger of the locker docking station to determine whether sufficient capacity units are available for the locker; execute a contract for the delivery reservation reserving the capacity units; and update the public ledger to reflect the delivery reservation reserving the capacity units.

By several approaches, the at least one of the control circuits can be configured to: receive and authenticate a public key sent by the delivery device; and send a hash associated with the capacity units to the delivery device for authentication of the locker.

By some approaches, the locker docking station can include securing mechanisms for the plurality of locations and can be configured to: communicate with the locker when the locker is brought into proximity therewith; receive actual capacity units from the locker required for the locker to secure to the locker docking station; compare the actual capacity units to the capacity units reserved in the delivery reservation; and operate the securing mechanism to secure the locker thereto in response to determining that the actual capacity units is equal to or less than the capacity units reserved in the delivery reservation.

By several approaches, the locker docking station can be configured to: reject the locker in response to determining that the actual capacity units is greater than the capacity units reserved in the delivery reservation in combination with capacity units available in the public ledger; and send a signal to a delivery device providing notification of the rejection.

By some approaches, the locker docking station can be configured to operate the securing mechanism to decouple the locker therefrom in response to reception of a signal from the locker and/or a delivery device. By further approaches, upon decoupling of the locker, the locker docking station can be configured to: receive a signal from the locker to release the reserved capacity units; and update the public ledger to reflect the released capacity units.

By several approaches, the plurality of locations of the locker docking station can each be assigned to individual users; and the delivery request can be a delivery request to reserve one or more of the plurality of locations associated with a user identified in an order for the locker.

In several embodiments, a method for reserving locations on a locker docking station is described herein that includes: receiving a request at at least one of a locker docking station and one or more control circuits in communication with the locker docking station for a delivery reservation from a delivery device for securing a locker to one or more of a plurality of locations of the locker docking station; analyzing a public ledger of the locker docking station maintained by the one or more control circuits to determine whether sufficient capacity units associated with the plurality of locations are available for the locker, the public ledger containing a record of available and reserved capacity units for the locker docking station; executing a contract for the delivery reservation reserving the capacity units; and updating the public ledger to reflect the delivery reservation reserving the capacity units.

By some approaches, the method can further include: receiving and authenticating a public key sent by the delivery device; and sending a hash associated with the capacity units to the delivery device for authentication of the locker.

By several approaches, the method can further include: communicating with the locker when the locker is brought into proximity with the locker docking station; receiving actual capacity units at the locker docking station from the locker required for the locker to secure to the locker docking station; comparing the actual capacity units to the capacity units reserved in the delivery reservation; and operating a securing mechanism of the locker docking station to secure the locker to the locker docking station in response to determining that the actual capacity units is equal to or less than the capacity units reserved in the delivery reservation.

By some approaches, the method can further include: rejecting the locker in response to determining that the actual capacity units is greater than the capacity units reserved in the delivery reservation in combination with capacity units available in the public ledger; and sending a signal to a delivery device providing notification of the rejection.

By several approaches, the method can further include operating the securing mechanism to decouple the locker from the locker docking station in response to reception of a signal from the locker and/or a delivery device. By further approaches, the method can further include, upon decoupling of the locker from the locker docking station: receiving a signal from the locker to release the reserved capacity units; and updating the public ledger to reflect the released capacity units.

By some approaches, the method can further include assigning the plurality of locations of the locker docking station to individual users; and wherein receiving the request for the delivery reservation can include receiving a request to reserve one or more of the plurality of locations associated with a user identified in an order for the locker.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A reservation system for locations on a locker docking station, the system comprising:

the locker docking station having a plurality of locations thereon configured to have a locker secured thereto, the plurality of locations having associated capacity units;

a plurality of securing mechanisms configured to selectively couple lockers to the locker docking station and wherein the locker docking station includes a support structure with the plurality of securing mechanisms mounted thereto;

one or more control circuits in communication with at least one of a plurality of locker docking stations including the locker docking station, at least one of the one or more control circuits configured to maintain a public ledger of the capacity units for the plurality of locker docking stations, the public ledger containing a record of available and reserved capacity units for the plurality of locker docking stations;

wherein at least one of the locker docking station and the one or more control circuits is configured to:

receive a request for a delivery reservation from a delivery device for delivery of a locker to one or more of the plurality of locations of the locker docking station;

analyze the public ledger of the locker docking station to determine whether sufficient capacity units are available for the locker;

execute a contract for the delivery reservation reserving the capacity units;

update the public ledger to reflect the delivery reservation reserving the capacity units;

communicate with the locker when the locker is brought into proximity with the locker docking station;

receive actual capacity units from the locker required for the locker to secure to the locker docking station;

compare the actual capacity units to the capacity units reserved in the delivery reservation; and operate at least one of the plurality of securing mechanisms to secure the locker to the locker docking station in response to determining that the actual capacity units is equal to or less than the capacity units reserved in the delivery reservation.

2. The system of claim 1, wherein the at least one of the control circuits is configured to:
receive and authenticate a public key sent by the delivery device; and
send a hash associated with the capacity units to the delivery device for authentication of the locker.

3. The system of claim 1, wherein the at least one of the control circuits is configured to update the public ledger and the locker docking station is further configured to send the updated public ledger to a central server for auditing.

4. The system of claim 1, wherein the locker docking station is configured to:
reject the locker in response to determining that the actual capacity units is greater than the capacity units reserved in the delivery reservation in combination with capacity units available in the public ledger; and
send a signal to the delivery device providing notification of the rejection.

5. The system of claim 1, wherein the locker docking station is configured to operate the securing mechanism to decouple the locker therefrom in response to reception of a signal from the locker and/or the delivery device.

6. The system of claim 5, wherein upon decoupling of the locker, the locker docking station is configured to:
receive a signal from the locker to release the reserved capacity units; and
update the public ledger to reflect the released capacity units.

7. The system of claim 1, wherein the contract for the delivery reservation includes a pick-up time for retrieval of the locker from the locker docking station; and the locker docking station is configured to send a notification signal to the delivery device in response to determining that the locker has not been retrieved by the pick-up time.

8. The system of claim 1, wherein the plurality of locations of the locker docking station are each assigned to individual users; and the delivery request is a delivery request to reserve one or more of the plurality of locations associated with a user identified in an order for the locker.

9. The system of claim 1, wherein the at least one of the control circuits is configured to communicate with delivery devices from a plurality of delivery companies.

10. The system of claim 1 further comprising a central server that is in communication with the plurality of locker docking stations, the central server configured to audit one or more public ledgers for one or more docking stations.

11. A method for reserving locations on a locker docking station, the method comprising:
receiving a request at at least one of the locker docking station and one or more control circuits in communication with the locker docking station for a delivery reservation from a delivery device for securing a locker to one or more of a plurality of locations of the locker docking station;
selectively coupling lockers to the locker docking station via securing mechanisms of the locker docking station;
analyzing a public ledger of the locker docking station maintained by the one or more control circuits to determine whether sufficient capacity units associated with the plurality of locations are available for the locker, the public ledger containing a record of available and reserved capacity units for the locker docking station;
executing a contract for the delivery reservation reserving the capacity units;
updating the public ledger to reflect the delivery reservation reserving the capacity units;
communicating with the locker when the locker is brought into proximity with the locker docking station;
receiving actual capacity units at the locker docking station from the locker required for the locker to secure to the locker docking station; and
comparing the actual capacity units to the capacity units reserved in the delivery reservation; and
operating at least one of the securing mechanisms of the locker docking station to secure the locker to the locker docking station in response to determining that the actual capacity units is equal to or less than the capacity units reserved in the delivery reservation.

12. The method of claim 11, further comprising:
receiving and authenticating a public key sent by the delivery device; and
sending a hash associated with the capacity units to the delivery device for authentication of the locker.

13. The method of claim 11, wherein updating the public ledger further comprises sending the updated public ledger to a central server for auditing.

14. The method of claim 11, further comprising:
rejecting the locker in response to determining that the actual capacity units is greater than the capacity units reserved in the delivery reservation in combination with capacity units available in the public ledger; and
sending a signal to the delivery device providing notification of the rejection.

15. A method for reserving locations on a locker docking station, the method comprising:
receiving a request at at least one of the locker docking station and one or more control circuits in communication with the locker docking station for a delivery reservation from a delivery device for securing a locker to one or more of a plurality of locations of the locker docking station;
selectively coupling lockers to the locker docking station via securing mechanisms of the locker docking station;
analyzing a public ledger of the locker docking station maintained by the one or more control circuits to determine whether sufficient capacity units associated with the plurality of locations are available for the locker, the public ledger containing a record of available and reserved capacity units for the locker docking station;
executing a contract for the delivery reservation reserving the capacity units;
updating the public ledger to reflect the delivery reservation reserving the capacity units;
operating at least one of the securing mechanisms of the locker docking station to decouple the locker from the locker docking station in response to reception of a signal from the locker and/or the delivery device
upon decoupling of the locker from the locker docking station:
receiving a signal from the locker to release the reserved capacity units; and
updating the public ledger to reflect the released capacity units.

16. The method of claim 15, further comprising sending a notification signal to the delivery device in response to determining that the locker has not been retrieved by a pick-up time specified in the delivery contract.

17. The method of claim 11, further comprising assigning the plurality of locations of the locker docking station to individual users; and wherein receiving the request for the delivery reservation comprises receiving a request to reserve one or more of the plurality of locations associated with a user identified in an order for the locker.

18. A reservation system for locations on a locker docking station, the system comprising:
  the locker docking station having a plurality of locations thereon configured to have a locker secured thereto, the plurality of locations having associated capacity units;
  one or more control circuits in communication with at least one of a plurality of locker docking stations including the locker docking station, at least one of the one or more control circuits configured to maintain a public ledger of the capacity units for the plurality of locker docking stations, the public ledger containing a record of available and reserved capacity units for the plurality of locker docking stations;
  wherein at least one of the locker docking station and the one or more control circuits is configured to:
    receive a request for a delivery reservation from a delivery device for delivery of a locker to one or more of the plurality of locations of the locker docking station;
    analyze the public ledger of the locker docking station to determine whether sufficient capacity units are available for the locker;
    execute a contract for the delivery reservation reserving the capacity units; and
    update the public ledger to reflect the delivery reservation reserving the capacity units;
  wherein the docking station is configured to operate at least one of a plurality of securing mechanisms to decouple the locker therefrom in response to reception of a signal from the locker and/or the delivery device and upon decoupling of the locker, the locker docking station is additionally configured to:
  receive a signal from the locker to release the reserved capacity units; and
  update additional capacity units of the public ledger upon decoupling of the locker from the docking station.

* * * * *